United States Patent [19]

Chang et al.

[11] 4,197,580
[45] Apr. 8, 1980

[54] DATA PROCESSING SYSTEM INCLUDING A CACHE MEMORY

[75] Inventors: Shih-jeh Chang, Reynoldsburg, Ohio; Wing N. Toy, Glen Ellyn, both of Ill.

[73] Assignee: Bell Telephone Laboratories, Incorporated, Murray Hill, N.J.

[21] Appl. No.: 913,567

[22] Filed: Jun. 8, 1978

[51] Int. Cl.² .................................. G06F 13/06
[52] U.S. Cl. .................................... 364/200
[58] Field of Search ... 364/200 MS File, 900 MS File

[56] References Cited

U.S. PATENT DOCUMENTS

| | | | |
|---|---|---|---|
| 3,588,839 | 6/1971 | Belady et al. | 364/200 |
| 3,611,315 | 10/1971 | Murano et al. | 364/200 |
| 3,735,360 | 5/1973 | Anderson et al. | 364/200 |
| 3,840,862 | 10/1974 | Ready | 364/200 |
| 3,949,368 | 4/1976 | West | 364/200 |
| 3,979,726 | 9/1976 | Lange et al. | 364/200 |
| 3,984,818 | 10/1976 | Gnadeberg et al. | 364/200 |
| 4,075,686 | 2/1978 | Calle et al. | 364/200 |

Primary Examiner—Gareth D. Shaw
Assistant Examiner—Thomas M. Heckler
Attorney, Agent, or Firm—Peter Visserman

[57] ABSTRACT

A data processing system includes a memory arrangement comprising a main memory, and a cache memory including a validity bit per storage location to indicate the validity of data stored therein. Cache performance is improved by a special read operation to eliminate storage of data otherwise purged by a replacement scheme. A special read removes cache data after it is read and does not write data read from the main memory into the cache. Additional operations include: normal read, where data is read from the cache memory if available, or, from main memory and written into cache; normal write, where data is written into main memory and the cache is interrogated, in the event of a hit, the data is either updated or effectively removed from the cache by invalidating its associated validity bit; and special write, where data is written both into main memory and the cache.

7 Claims, 7 Drawing Figures

| PROCESSOR CONTROL SIGNALS | HIT/MISS | VALIDITY BIT STATUS** | TAG MEMORY OPERATION | DATA MEMORY OPERATION |
|---|---|---|---|---|
| 1-READ NORMAL | HIT | X | READ | READ |
| 2-READ NORMAL | MISS | V | READ/WRITE | WRITE |
| 3-READ SPL | HIT | I | READ/WRITE | READ |
| 4-READ SPL | MISS | X | READ | |
| 5-WRITE NORMAL | HIT | I [V]* | READ/WRITE | [WRITE]* |
| 6-WRITE NORMAL | MISS | X | READ | |
| 7-WRITE SPL | HIT | V | READ/WRITE | WRITE |
| 8-WRITE SPL | MISS | V | READ/WRITE | WRITE |

**V = VALID
  I = INVALID
  X = DONT CARE

*REQUIRED FOR UPDATE OF CACHE MEMORY ON A NORMAL WRITE WHERE A CACHE HIT IS ENCOUNTERED

FIG. 7

CACHE MEMORY

| FIG. 2 |
|---|
| FIG. 3 |
| FIG. 4 |
| FIG. 5 |

DATA PROCESSING SYSTEM INCLUDING A CACHE MEMORY

TECHNICAL FIELD

Our invention relates to data processing systems and particularly to a cache memory arrangement for facilitating the handling of subroutines and similar data handling by a data processing system.

BACKGROUND OF THE INVENTION

Computer systems comprising a processor; a high capacity, low-speed (relative to the processor speed) main memory; and a low capacity, high-speed (comparable to the processor speed) cache memory are well known in the prior art to reduce effective memory access time for a reasonable cost. Information required by the processor is read from the main memory, provided to the processor, and written into the cache memory. If the same information is again required by the processor, it is read directly from the cache memory to avoid the processing time delay which is encountered when reading the main memory. If the cache memory is filled and the processor requires information which is not stored in the cache memory, the required information must be obtained from the main memory and a storage location in the cache memory must be identified for storing this new information. A satisfactory cache storage location for storing new information is identified by one of several commonly used replacement algorithms, e.g., random replacement and least recently used. The replacement of information in the cache memory provides current information in the cache memory for use by the processor.

Subroutines are used in data processing systems to reduce the amount of memory required and to simplify the coding or programming of the data processing system. However, the use of subroutines can cause time delays since return addresses and the contents of processor registers must be saved upon entering a subroutine so that processing can be resumed upon return from that subroutine. In many data processing systems, subroutines involve multiple main memory writes and reads with the resulting processor delay due to the disparity between memory access time and processor cycle time. In data processing systems which include a cache memory the delay is reduced by handling the necessary information for subroutine operations through the cache memory.

Subroutine information required to resume normal processing upon return from a subroutine is required only one time, i.e., upon return from the associated subroutine. When a cache memory is used for storing subroutine information, the subroutine information which has been read from the cache memory by the processor will not be required again but remains in the cache memory until removed by the replacement algorithm used in the cache memory. Accordingly, cache memory operation is not as efficient as possible.

SUMMARY OF THE INVENTION

Cache memory efficiency is improved in accordance with our invention by a read operation which reads a data word from the cache memory and effectively removes the data word from the cache memory during the same read cycle. This is accomplished by generating and storing a validity bit per cache memory storage location to indicate the status of the data stored in the corresponding cache memory storage location.

For the read operation, the cache memory is interrogated and if the requested data word is present in the cache memory (this is referred to as a cache "hit"), the information is read from the cache memory and transferred to the processor, and program execution proceeds. However, the validity bit associated with that cache memory storage location is set to its invalid state. Advantageously, this provides an immediate location in the cache memory for the storage of new information read from the main memory and does not require that useless information, e.g., previously read subroutine information, be purged from the cache memory by repetitive operation of the replacement algorithm. An additional feature of the read operation is that useless information read from the main memory is not written into the cache memory. If a requested data word is not stored in the cache memory (this is referred to as a cache "miss") and therefore must be read from the main memory, the data word so read is gated to the processor but is not written into the cache memory.

Another feature of our invention is that two write operations are available and are referred to hereinafter as a normal write and a special write. For a normal write, a data word is written directly into the main memory but not into the cache memory; however, the cache memory is interrogated. If the cache hit is encountered, the data word can be either updated or it can be effectively removed from the cache memory by setting the validity bit of the cache storage location which led to the cache hit to the invalid state (update or removal depending on user preference). For a special write, a data word is written into both the cache memory and the main memory.

An additional feature of our invention is a cache memory replacement arrangement which selectively generates a replacement signal in response to one of two signals. A first signal is generated in response to validity bits stored in the cache memory, and a second random signal is generated. If any one of the possible storage locations for a given data word contains invalid data, the first signal is selected to generate the replacement signal; but, if none of the possible storage locations for a given data word contain invalid data, then the random signal is selected to generate the replacement signal.

BRIEF DESCRIPTION OF THE DRAWING

The invention will be better understood from the following detailed description when read with reference to the drawing in which:

FIG. 7 is a composite drawing indicating how FIGS. 2 through 5 are arranged to form a block diagram of the cache memory.

DETAILED DESCRIPTION

Figure 1:
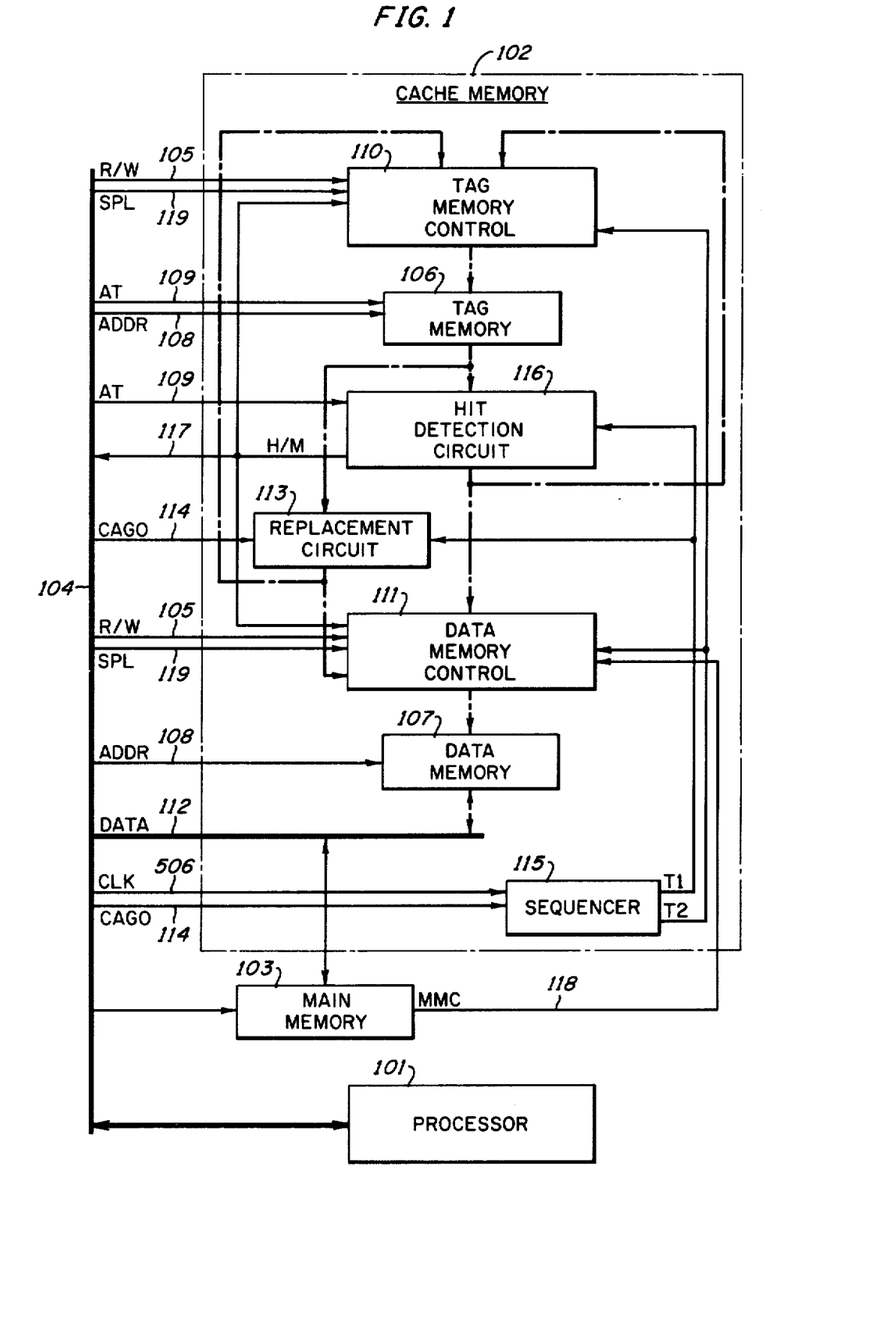
FIG. 1 is a block diagram of a data processing system in accordance with our invention.

With reference to FIG. 1, the cache memory 102 stores a subset of the data word stored in the main memory 103 so that the processor 101 has rapid access to that subset of data words. Data words stored in the cache memory 102 are stored in the data memory 107 and those data words are identified by a directory referred to as the tag memory 106. The storage locations of the tag memory 106 correspond to the storage locations of the data memory 107 and store address tags to perform the identification of the data words in the data memory 107. Each tag memory storage location includes a validity bit to indicate the current status of the data word stored in the corresponding data memory storage location. A valid validity bit (a high state or logical 1) indicates that the corresponding data word in the data memory 107 is valid; on the other hand, an invalid validity bit (a low state or logical 0) indicates that the corresponding data word is invalid and cannot be used by the processor 101.

A cache memory is referred to as purely associative if any main memory data word can be stored into any cache memory storage location. In a purely associative cache memory, each address tag stored must be examined to determine whether a defined data word is stored in the cache memory. A cache memory is referred to as set-associative if any given main memory data word can only be stored into a subset of the cache memory storage locations. A set-associative cache memory reduces the circuitry and/or time required to perform a cache operation since only the corresponding subset of address tags need to be examined to determine whether a defined data word is stored in the cache memory. The cache memory 102 of the illustrative embodiment is set-associative and has a set size equal to 4 (see FIGS. 2 through 5). It is noted that any set size could be used and that our invention is equally applicable to a data processing system utilizing a fully associative cache memory.

The processor 101 addresses the memory system comprising the main memory 103 and the cache memory 102 by providing the main memory address of a required data word. The main memory address is divided into two groups of address bits for cache memory operation. The low order address bits (ADDR) address locations in the tag memory 106 and the data memory 107 via the conductors 108. The high order address bits serve as the address tags (AT) which are stored in the tag memory 106 to identify data words stored in the data memory 107 and are transmitted to the tag memory 106 and the hit detection circuitry 116 via the conductors 109. The tag memory control circuit 110 generates the validity bits and controls the read and write operations of the tag memory 106. The data memory control circuit 111 controls the read and write operations of the data memory 107. These control circuits will be fully described hereinafter.

To determine if the required data word is stored in the cache memory, the subset of four address tags which could identify the required data word are read from the tag memory 106 and passed to the hit detection circuitry 116 where they are compared to the address tag of the required data word. If there is a match between any one of the address tags read from the tag memory 106 and the address tag of the required data word provided by the processor on the conductor 109 and the address tag read from the tag memory also includes a valid validity bit, then a hit signal is generated. Otherwise, a miss signal is generated. The hit/miss signal is transmitted to the processor 101, to the data memory control circuit 111, and to the tag memory control circuit 110 via the conductor 117.

The replacement circuit 113 receives the validity bits read from the tag memory 106 to select a cache memory location into which a new data word, not presently stored in the cache memory, is to be stored. If any of the data words stored in the subset of data memory locations which corresponds to the new data word are marked invalid in the tag memory 106, then one of those locations storing an invalid data word is selected on a preference basis. If all four locations available for the storage of the new data word contain valid data, then one of those locations is selected for replacement on a random basis. The operation of the replacement circuit 113 will be more fully described hereinafter.

The processor 101 issues four different commands to the cache memory 102: normal read, special read, normal write, and special write. The commands can be generated by state-of-the-art processors, for example by microcode in response to prescribed program instructions executed by the processor 101. The read/write signal (R/W, a low state or logical 0 for write and a high state or logical 1 for read), and the special signal (SPL, a low state or logical 0 for special and a high state or logical 1 for normal) are transferred to the cache memory 102 via the conductors 105 and 119, respectively. For write operations the processor 101 provides data words on the data bus 112 and for read operations the processor receives data words on the data bus 112. The processor initially sets up the command signals, the address signals, and data signals (if required) and then activates the cache go (CAGO, active in a low state or logical 0). The cache go signal is transmitted to the sequencer 115 via the conductor 114. The sequencer 115 provides timing pulses required for cache memory operations and will be more fully described hereinafter.

FIGS. 2 through 5 form a detailed block diagram of the set-associative cache memory 102. The tag memory 106 comprises four independent but identical tag memory modules 201, 202, 203, and 204. Similarly, the data memory 107 comprises four independent but identical data memory modules 410, 411, 412, and 413 which correspond to the tag memory modules. All tag memory modules and data memory modules are simultaneously addressed by the low order address bits of the main memory address via the conductors 108. If a data word is stored in the data memory 107, it will be stored in one of the data memory modules at an address which equals the low order address bits of the main memory address for the data word. Further, if a data word is stored in one of the data memory modules, the data word address tag (the high order bits of the main memory address for the data word) will be stored in the corresponding tag memory module to so indicate. Each tag memory module storage location also contains a validity bit which indicates the status of the corresponding data word stored in a data memory module, i.e., whether the data word is valid and can be used by the processor or is invalid. Accordingly, the first step in cache memory operation is to read the tag memory modules to determine whether a required data word is stored in the cache memory.

Figure 2:
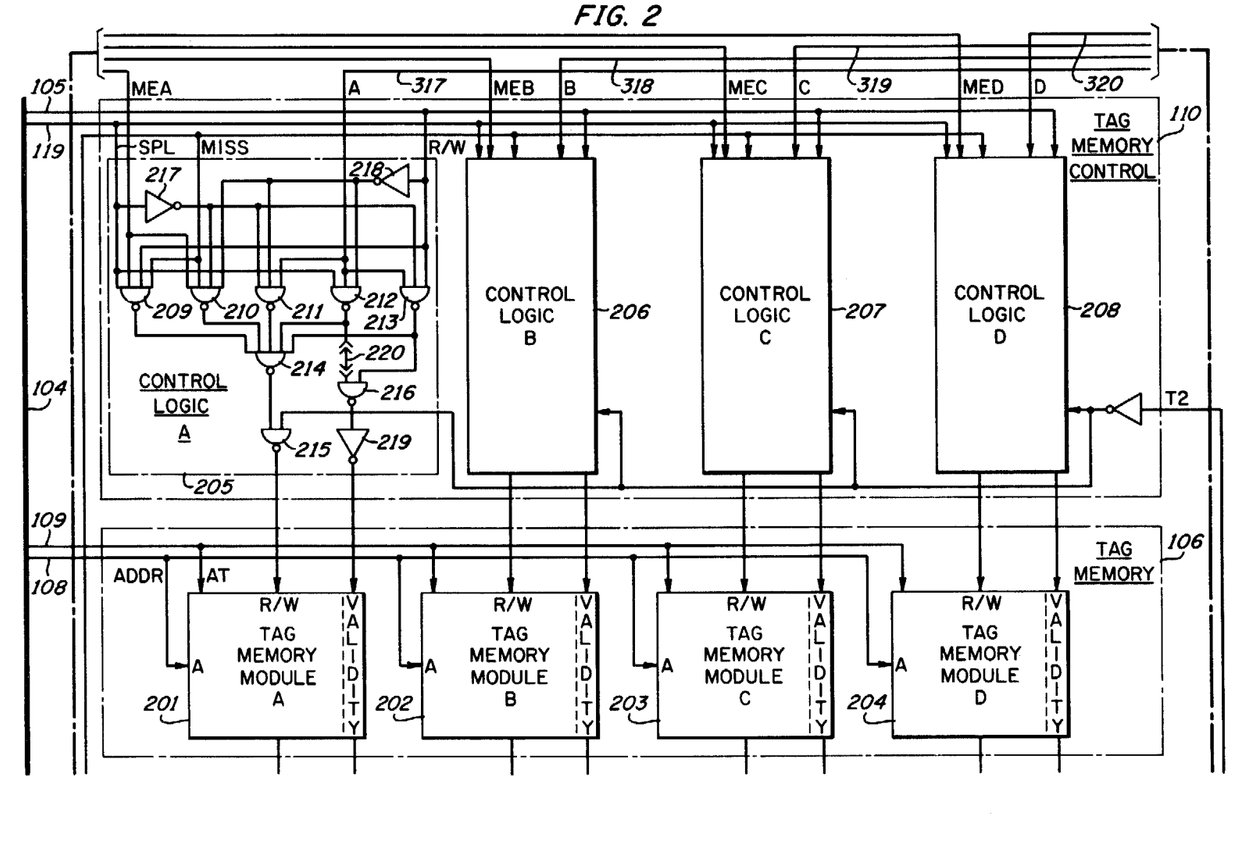
FIGS. 2 through 5 are a detailed block diagram of the cache memory of FIG. 1.
Figure 3:
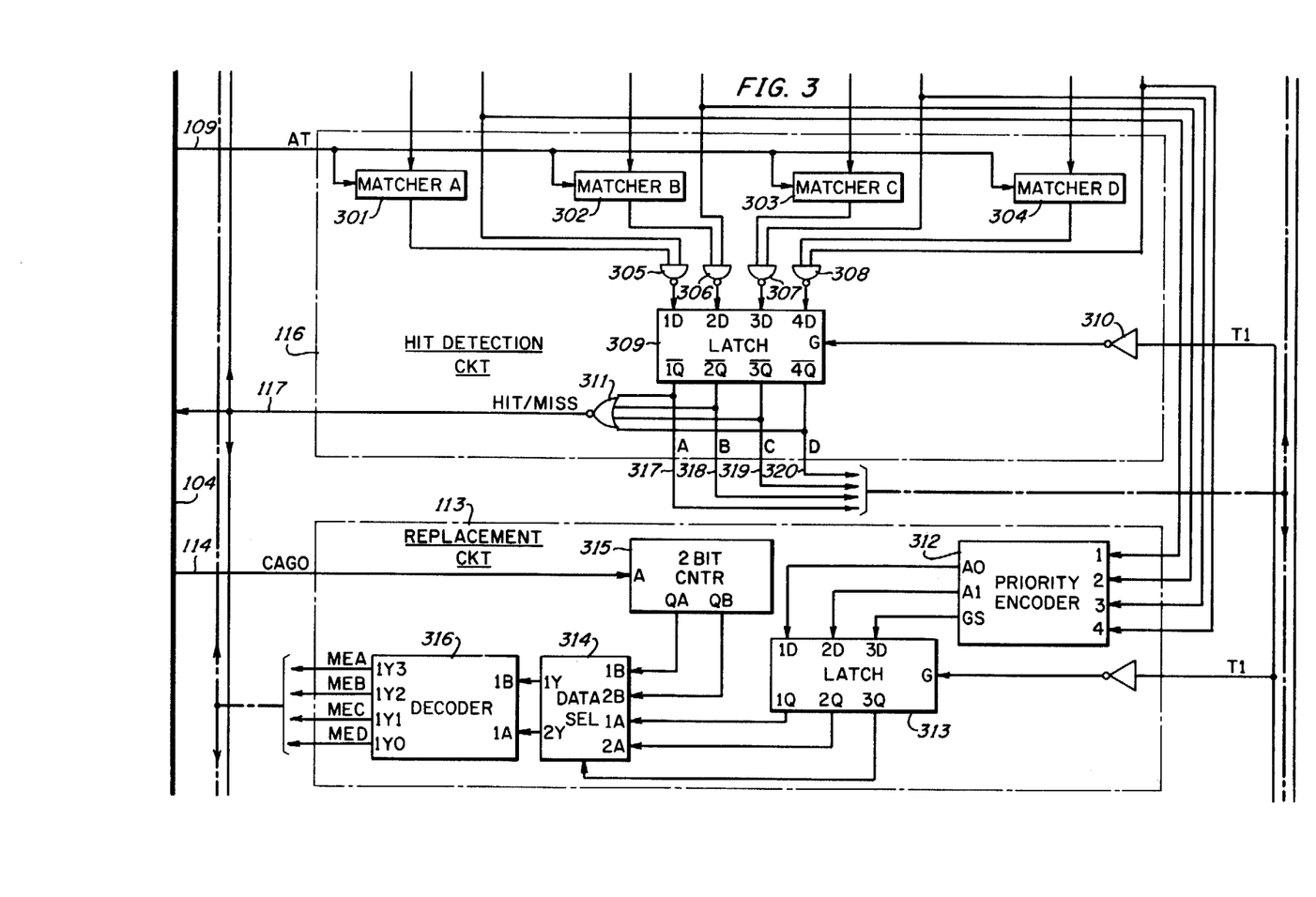

During the initial phases of a cache memory cycle, the tag memory modules are read due to the timing signal T2 from the sequencer 115. The address tags read from the tag memory modules at the address provided by the processor 101 on the conductors 108 are passed to the associated matcher circuits 301, 302, 303, and 304 which are part of the hit detection circuit 116. The address tag provided by the processor on the conductors 109 are the other input to the matcher circuits 301 through 304. If the address tag read from a tag memory module matches the address tag present on the conductors 109, then that matcher circuit passes a high signal on its output terminal to its associated NAND gate of the NAND gates 305, 306, 307, and 308. The validity bits read from the tag memory modules are also passed to the NAND gates 305 through 308. If a matcher circuit provides a high signal indicating a match has occurred and the associated validity bit is also a high signal indicating that the stored data word is valid, then the appropriate NAND gate of the NAND gates 305 through 308 signals a hit by providing a low signal on its output terminal. The signals from the NAND gates 305 through 308 are stored and inverted by latch 309 so that the contents of the tag memory modules can be changed while the hit or miss information is retained. The Q outputs of the bistable latch 309 follow their corresponding data (D) inputs as long as the signal on the enable terminal (G) is high. If the signal on the enable terminal goes low, the signals present on the data inputs at the time of the transition are locked into the bistable latch 309 until the signal on the enable terminal (G) again goes high. The sequencer 115 provides four equal timing pulses T0, T1, T2, and T3 which are active in a low state or logical 0. The inverter 310 provides the proper polarity so that the signals generated by the NAND gates 305 through 308 are registered during the T1 timing pules and locked in by the termination of the T1 timing pulse. If a cache hit is detected in one of the tag memory modules, then the corresponding hit signal A, B, C, or D (transmitted respectively on the conductors 317, 318, 319, and 320) will be high. The NOR gate 311 receives the hit signals from the $\bar{Q}$ output terminals of the bistable latch 309 to generate a miss signal (a high state or logical 1) on the conductor 117 when no hit is detected.

The replacement circuit 113 determines which cache memory storage location (i.e., a storage location in a tag memory module and the corresponding storage location in a data memory module) is to be used to store a new data word which is required by the processor but is not presently stored in the cache memory. The replacement circuit 113 selects a storage location which contains invalid data for replacement if any one of the storage locations of the available subset of storage locations contains invalid data. If more than one storage location of the subset contains invalid data, the replacement circuit 113 selects the storage location in the highest priority data memory module with A preferred over B, B over C, and C over D. If all the storage locations of the subset contain valid data words, then the replacement circuit 113 defaults to a random replacement algorithm, i.e., randomly selects one of the storage locations of the subset for storing the new data word. The validity bits read from the tag memory modules are provided to the priority encoder 312 of the replacement circuit 113. If all four input signals to the priority encoder 312 are high, then the signals on the output terminals A0, A1, and GS are all high. This would correspond to the case where the data words contained in all data memory modules are valid and, therefore, the replacement circuit 113 defaults to the random replacement algorithm. If any of the signals on the input terminals to the priority encoder 312 are low, then the signal on the output terminal GS is low and the signals on the output terminals A0 and A1 are as follows: if the signal on input terminal 1 is low, the signals on the output terminals A0 and A1 are low; if the signal on input terminal 1 is high but the signal on the input terminal 2 is low, then the signals on the output terminals A0 and A1 are respectively high and low; if the signals on input terminals 1 and 2 are high but the signal on input terminal 3 is low, then the signals on output terminals A0 and A1 are respectively low and high; and if the signals on input terminals 1, 2, and 3 are high but the signal on input terminal 4 is low, then the signals on output terminals A0 and A1 are both high. The outputs from the priority encoder 312 are passed to the bistable latch 313 which is similar to the bistable latch 309 described in the preceding paragraph. When the signal on the input terminal G of the bistable latch 313 is high, the signals on the output terminals 1Q, 2Q, and 3Q follow the signals on the data input terminals 1D, 2D, and 3D. When the signal on the enable terminal G goes low, the signals that are present on the data input terminals at the transition are retained on the Q output terminals until the signal on the G terminal is again permitted to go high. The trailing edge of the timing signal T1 from the sequencer 115 locks the outputs of the priority encoder into the bistable latch 313 after the outputs from the priority encoder have been allowed to stabilize.

The signals on the output terminals 1Q and 2Q from the bistable latch are passed to the inputs 1A and 2A of the data selector 314. The signal on the output terminal 3Q from the bistable latch 313 controls the data selector 314. Random replacement is accomplished by the two-bit counter 315 which is counted each time a cache go signal is provided by the processor 101. The output signals of the two-bit counter 315 are provided to the 1B and 2B inputs of the data selector 314. Since the occurrence of hits and misses in cache memory operation is a random happening, the count on the two-bit counter 315 is close to a random number. The replacement circuit 113 defaults to random replacement if the validity bits read from the tag memory modules are in a high stage indicating that the addressed subset of data words are valid. If this occurs, all four inputs to the priority encoder 312 are high so that the signal on the GS output terminal is high and is locked into the bistable latch 313. The 3Q output signal of the bistable latch 313 selects the inputs 1B and 2B from the two-bit counter 315 to be passed to the decoder 316 in this situation. Otherwise, if any input signal to the priority encoder 312 is low, the signal on the GS output terminal is low and the signals on the output terminals A0 and A1 from the priority encoder 312 which are locked into the bistable latch 313 are selected and passed to the decoder 316 through the inputs 1A and 2A of the data selector 314. The decoder 316 generates a high memory enable signal on one of its output terminals (1Y0 through 1Y3) and a low signal on the remaining three output terminals dependent upon the signals on the input terminals 1A and 1B as follows: 1A and 1B both low, 1Y0 high (memory enable D, MED); 1A and 1B high and low respectively, 1Y1 high (memory enable C, MEC); 1A and 1B low and high respectively, 1Y2 high (memory enable B, MEB); and 1A and 1B both high, 1Y3 high (memory enable A, MEA).

Figure 4:
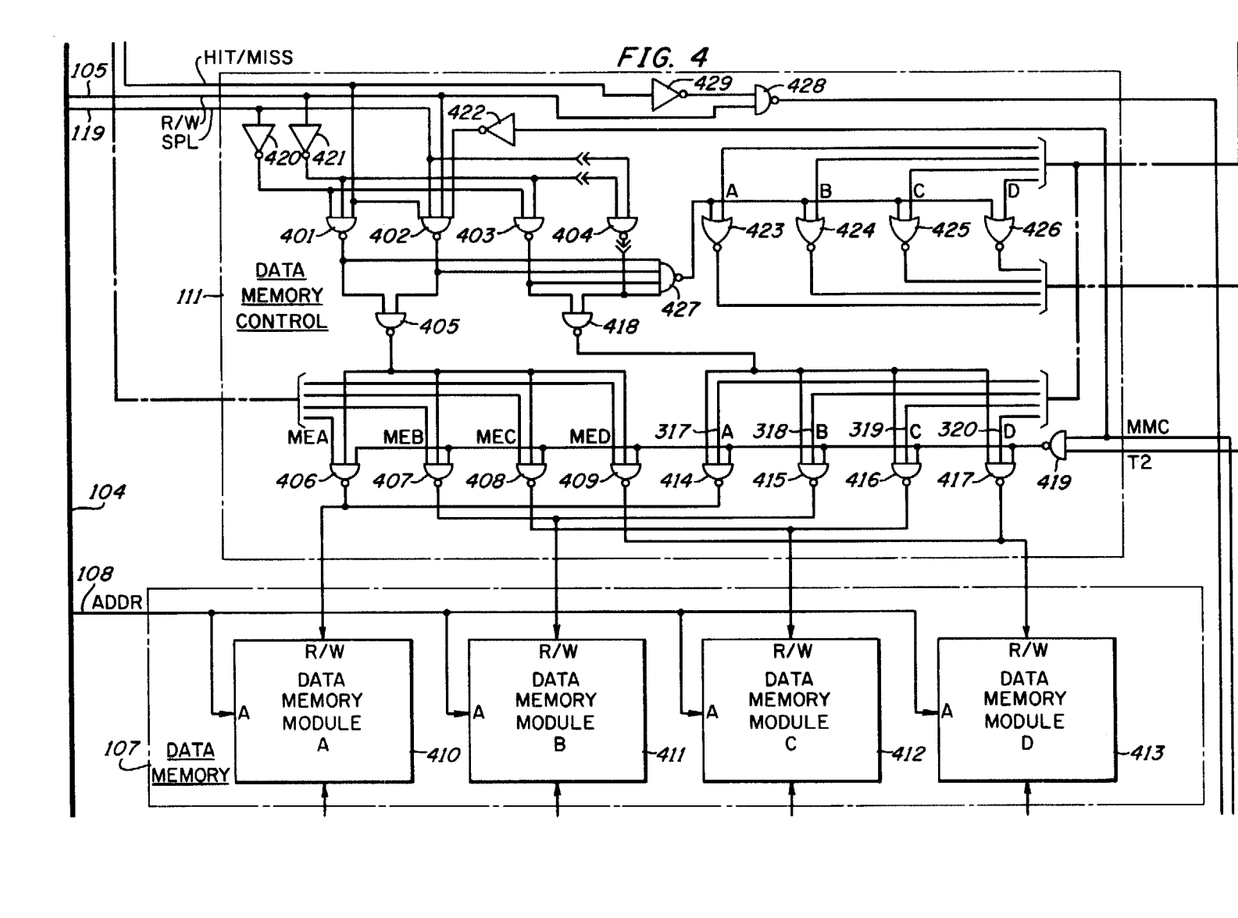
Figure 6:
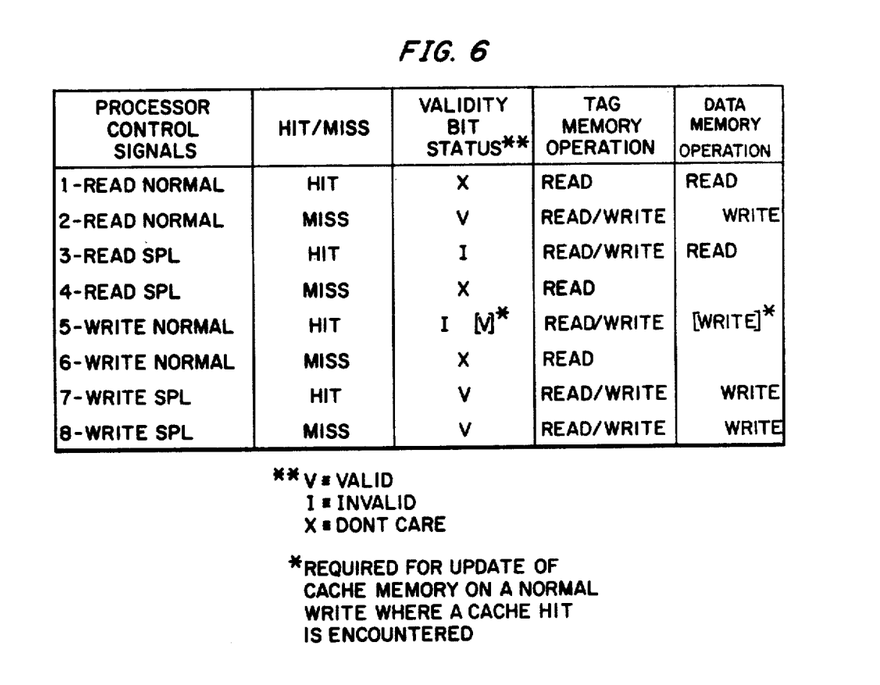
FIG. 6 is a chart showing cache memory operation for the various possible combinations of processor control signals and internally generated hit/miss signals.
Figure 7:
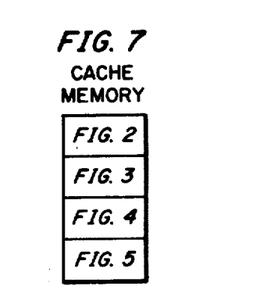

The tag memory control circuit 110 generates signals for reading and writing the tag memory modules 201 through 204 and also generates the validity bits to be written into the tag memory modules in response to the read/write and special signals from the processor, the signals from the hit detection circuit 116, the timing pulse T2 from the sequencer 115, and the signals from the replacement circuit 113. The data memory control circuit 111 generates signals for reading and writing the data memory modules 401 through 404 and for gating data words to and from the data memory 107 in response to the same signals which control the tag memory control circuit 110 and the main memory complete signal MMC. FIG. 6 summarizes the read/write operations performed on the tag memory 106 and the data memory 107 in response to specific combinations of processor control signals and hit/miss signals from the hit detection circuit 116. FIG. 6 does not specify the particular tag memory module and corresponding data memory module to be operated upon since it depends upon the particular hit indication from the hit detection circuit 116, i.e., A, B, C, or D in the case of a cache memory hit, and depends upon the particular memory enable signal from the replacement circuit 113, i.e., MEA, MEB, MEC, or MED in the case of a cache memory miss. Cache memory operation will become clearer after the tag memory control circuit 110, the data memory control circuit 111, and sample cache memory operations are described.

The tag memory control circuit 110 comprises the four identical tag memory control logic circuits 205, 206, 207, and 208, each of which is associated with a corresponding tag memory module. Each of the control logic circuits 205 through 208 comprises decoder circuitry responsive to the control signals sent from the processor 101, to the hit/miss signals from the hit detection circuit 116, and to the memory enable signals from the replacement circuit 113. Since the tag memory control logic circuits are identical to one another, only the control logic circuit 205 is detailed in the drawing and described here. The NAND gates 209, 210, 211, 212, 213, and 214 serve as a decoder to provide a high signal on the output of the NAND gate 214 for the following combinations of cache control signals and internally generated signals: normal, read, miss, and memory enable A; special, write, miss, and memory enable A; special, write, and hit signal A; normal, write, and hit signal A; and special, read, and hit signal A. These combinations of signals correspond to the signal combinations 2, 8, 7, 5, and 3, respectively in FIG. 6. If one of these signal combinations is presented to the tag memory control logic circuit 205 the NAND gate 215 is enabled. With the NAND gate 215 enabled, timing pulse T2 from the sequencer 115 causes the signal on the output of the NAND gate 215 to go low which writes the address tag (AT) presented by the processor 101 on the conductors 109 into tag memory module 201 at the location addressed by the address signals provided by the processor 101 on the conductors 108. It is understood that prior to the arrival of the timing pulse T2 the tag memory modules 201 through 204 are in a read mode to provide inputs for the hit detection circuit 116 and the replacement circuit 113.

As previously described, a valid data word is indicated by a high signal for the validity bit and an invalid data word is indicated by a low signal for the validity bit. The NAND gate 216 is controlled either by the output signals of the NAND gates 212 and 213 or by the output signal of the NAND gate 213 alone to generate invalid validity bits to be written into the tag memory module 201. The NAND gate 212 responds to the combination of signals normal, write, and hit signal A; and the NAND gate 213 responds to the combinations of signals special, read, and hit signal A. The NAND gate 216 responds to the output signals of one or both of the NAND gates 212 and 213 to generate an invalid validity bit for these two signal combinations. The conductor 220 is optionally provided to connect the output of the NAND gate 212 to one of the inputs of the NAND gate 216. For a normal write operation in which a cache hit is encountered, the cache memory has two options: (1) the data word stored in the data memory 107 which led to the cache hit can be updated by writing the new data word into the data memory 107; or (2) the data word stored in the data memory 107 which led to the cache hit can be effectively removed by writing an invalid validity bit into the corresponding storage location of the tag memory 106. The first option is provided by deleting the conductor 220 and providing the NAND gate 404 in the data memory control circuit 111 to write the new data word into the data memory 107. The second option is provided by deleting the NAND gate 404 and providing the conductor 220 so that an invalid validity bit is generated and written into the tag memory 106. The NAND gate 212 corresponds to the signal combination 5 in FIG. 6 and the NAND gate 213 corresponds to the signal combination 3 in FIG. 6. The validity bit generated is written into the corresponding tag memory module at the same time as the address tag (AT). For all other signal combinations a valid validity bit is generated which corresponds to the validity bit status indicated in FIG. 6, i.e., for all these signal combinations the validity bit should be either valid or don't care. The inverter 219 provides the proper polarity for the validity bit while the inverters 217 and 218 provide proper polarity signals for the NAND gates 210, 211, 212, and 213. The tag memory control logic circuits 206, 207, and 208 function similarly when operations are to be performed on the tag memory modules 202, 203, and 204, respectively.

The data memory control circuit 111 comprises the NAND gates 401, 402, 403, and 404 which provide a low signal on their respective output terminals for the following combinations of input signals: special, write, and miss; normal, read, miss, and main memory complete (MMC which is generated by the main memory 103 when a main memory read is completed); special and write; and normal and write. As previously described, the NAND gate 404 is optionally provided when the conductor 220 is not provided to perform an update of cache information on a normal write when a hit is encountered. The NAND gates 401 and 402 decode cache operations where the data memory 107 is written on a cache miss and the NAND gates 403 and 404 decode cache operations where the data memory 107 is written on a cache hit. The selection of which data memory module to write is governed by the replacement circuit 113 for a cache miss and by the hit detection circuit 116 for a cache hit; accordingly, two sets of read/write gates are required which comprises the NAND gates 406, 407, 408, and 409 for a cache miss and the NAND gates 414, 415, 416, and 417 for a cache hit. The output signal of the NAND gate 405 is high if either of the NAND gates 401 or 402 is activated and one of the memory enable signals is also high. This combination of signals enables one of the NAND gates 406 through 409. The output signal of the NAND gate 418 is high if either of the NAND gates 403 or 404 is activated and, if a hit was encountered, one of the hit signals is also high. This combination of signals enables one of the NAND gates 414 through 417. The NAND gate 419 receives the timing pulse T2 from the sequencer 115 and the main memory complete signal from the main memory 103. Upon the occurrence of either of these signals, which are active low, the output of the NAND gate 419 goes high and is passed through the enabled NAND gate of one of the groups of NAND gates 406 through 409 or 414 through 417 to write the corresponding data memory module. The inverter circuits 420, 421, and 422 provide proper polarity signals.

Figure 5:
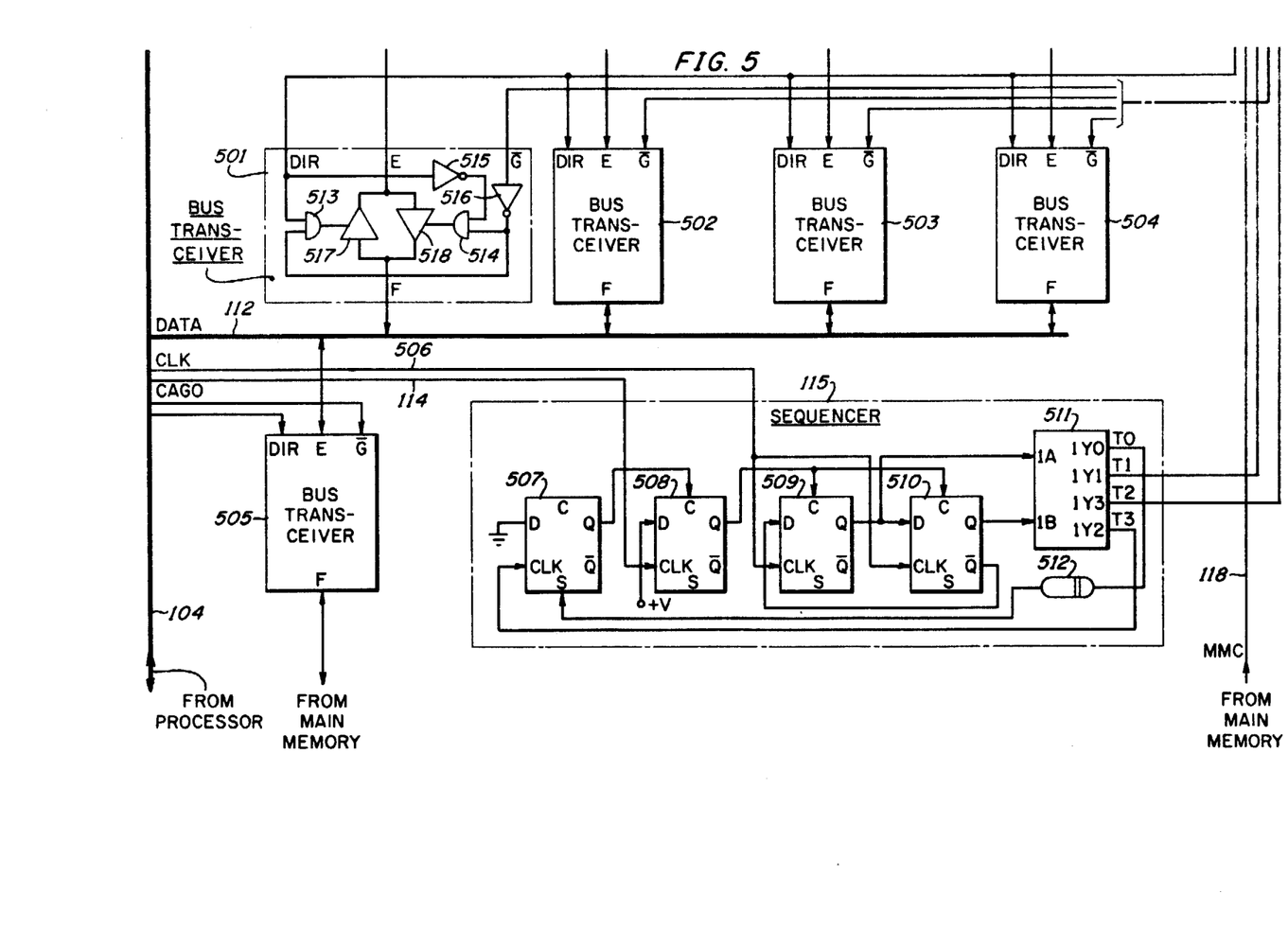

The bus transceivers 501 through 505 either pass signals from the E data terminals to the F data terminals, or pass signals from the F data terminals to the E data terminals, or present a high impedance between the E data terminals and the F data terminals dependent upon the control signals on the DIR and $\overline{G}$ terminals. The bus transceivers are identical to one another and are each constructed the same as bus transceiver 501 which comprises the AND gates 513 and 514, the inverters 515 and 516, and the bus drivers 517 and 518. A high signal on the enable terminal, $\overline{G}$ of a bus transceiver isolates the E terminals from the F terminals. A low signal on the enable terminal, $\overline{G}$, enables the bus transceiver and passes control of the direction of signal flow to the signal on the direction terminal, DIR, so that if the signal is high, data is passed from the F terminal to the E terminals and if the signal is low, data is passed from the E terminals to the F terminals. The processor 101 controls the bus transceiver 505 to control data flow between the main memory 103 and the data bus 112. The NOR gates 423 through 426 determine which of the bus transceivers 501 through 504 are enabled. When one of the output signals from one of the NAND gates 401 through 404 is low, which indicates that one of the data memory modules 410 through 413 is to be written, the output of the NAND gate 427 goes high which forces the output signals of all four NOR gates 423 through 426 low enabling all of the bus transceivers 501 through 504. The data transfer direction is determined by the signal from the NAND gate 428 which is low for the combination of signals read and cache hit but high for all other signal combinations. The bus transceivers are in the high impedance isolation state or are transferring data from the data bus 112 to the data memory modules unless the processor is requesting a read to prevent babble on the data bus for all other operations. Thus, data signals from the data bus 112 will be present on the data terminals of the data memory modules when one of them is written by the signals from one of the groups of NAND gates 406 through 409 or 414 through 417. When the signal from the NAND gate 427 is low, the outputs of the NOR gates 423 through 426 depend upon the hit signals A, B, C, and D from the hit detection circuit 116. When a hit is detected in one of the tag memory modules A, B, C, or D, the hit signal A, B, C, or D, transmitted to the NOR gates 423 through 426 goes high which causes the output of the corresponding one of the NOR gates to go low enabling the corresponding bus transceiver. With the signal from the NAND gate 428 being low and the signal from one of the NOR gates 423 through 426 being low, the bus transceiver corresponding to the data memory module containing the data word which caused the cache hit will be enabled and the direction of data flow will be from the E terminals to the F terminals so that the data word read from the corresponding data memory module will be transferred to the data bus 112.

The sequencer 115 provides internal timing pulses for cache memory operation. The sequencer receives a clock signal from the processor 101 on the conductor 506 and is activated by a cache go signal from the processor 101 on the conductor 114. The cache go signal from the processor is synchronized with the clock signal so that the sequencer 115 delivers full clock pulse timing signals. The D type flip-flops 507, 508, 509, and 510 respond to a low-to-high transition of the signal on their clock terminals to transfer the signal present at the D terminal to the Q terminal and may be hard set and hard cleared by low signals on the S and C terminals, respectively. The decoder 511 decodes signals on its input terminals 1A and 1B to provide a low signal on the output terminal which corresponds to the present input signals and high signals on the remaining output terminals of the output terminals 1Y0 through 1Y3. The flip-flops 508, 509, and 510 are in a cleared state (Q=0, $\overline{Q}$=1), and the flip-flop 507 is in a "SET" state (Q=1, $\overline{Q}$=1), when the sequencer 115 is activated by the cache go signal from the processor 101. The cache go signal provides a low-to-high transition on the clock terminal of the flip-flop 508 which sets it by transferring the logical 1 from the D terminal to the Q terminal; setting the flip-flop 508 removes the hard clear signal on the flip-flops 509 and 510 so that they can respond to the clock signal from the processor 101. During the first full clock cycle, the signal on the output 1Y0 of the decoder circuit 511 is low and the other outputs 1Y1 through 1Y3 are high. On the next low-to-high transition of the clock signal the flip-flop 509 is "SET" while the flip-flop 510 remains "CLEAR". This changes the input to the decoder circuit 511 so that the signal on the output terminal 1Y1 is low and the signals on the output terminals 1Y0, 1Y2, and 1Y3 are high. On the next low-to-high transition of the clock signal, the flip-flop 510 is "SET" while the flip-flop 509 remains "SET". This sequences the output of the decoder 511 so that the signal on the output terminal 1Y3 is low and the signals on the remaining output terminals are high. On the next low-to-high transition of the clock signal the flip-flop 509 is cleared and the flip-flop 510 remains "SET" which sequences the output of the decoder circuit 511 so that the signal on the output terminal 1Y2 is low and the signals on the remaining output terminals are high. On the next low-to-high transition of the clock signal, the flip-flop 510 is cleared while the flip-flop 509 remains "CLEAR" which causes the signal on the output terminal 1Y2 to go high and the signal on the output terminal 1Y0 to go low with the signals on the terminals 1Y1 and 1Y3 remaining high. The transition from low to high on the clock terminal of the flip-flop 507 places that flip-flop in a "CLEAR" state which clears the flip-flop 508, which in turn clears the flip-flops 509 and 510 and places a low clamp on those flip-flops so that they do not respond to the transitions of the clock signal. The low signal on the output terminal 1Y0 is delayed for a short period of time by the delay element 512 before it is applied to the "SET" terminal of the flip-flop 507 which sets the flip-flop 507 to remove the hard clear clamp on the flip-flop 508 to ready the sequencer 115 for activation by the cache go signal from the processor 101.

Two sample memory operations will now be described so that the operation of the cache memory may be more fully understood. These operations are: (1) a normal read accompanied by a cache miss; and (2) a special read accompanied by a cache hit. For ease of description, it is assumed that the memory enable A signal (MEA) is high for the cache miss and that the hit signal A is high for the cache hit. The processor 101 sets up the control signals, the address tag signals, and the data memory and tag memory address signals and then activates the cache go signal. In the case of a normal read, the read/write and special signals are both high which partially enables the NAND gate 209. During the first two timing pulses, the tag memory modules 201 through 204 are read at the address provided by the processor 101. The address tags read are passed to the matcher circuits 301 through 304 and the validity bits read are passed to the NAND gates 305 through 308 and the priority encoder 312. When timing pulse T1 terminates, the outputs of the NAND gates 305 through 308 are locked into the bistable latch 309 and the outputs of the priority encoder 312 are locked into the bistable latch 313. Since a miss is assumed the output signals from the bistable latch 309 are low and the output signal from the NOR gate 311 is correspondingly high. The outputs of the bistable latch 313 depend upon the status of the validity bits read from the tag memory modules and control the memory enable signals from the decoder 316 as previously described under the operation of the replacement circuit 113. The memory enable A signal (MEA) has been assumed to be high for ease of description. With the MEA signal high and the miss signal high, the NAND gate 209 is activated and provides a low output signal to an input of the NAND gate 214 to enable the NAND gate 215. Neither input to the NAND gate 216 is low and therefore its output is low and the output of the inverter 219 is high to generate a valid validity bit. The timing pulse T2 from the sequencer 115 activates the NAND gate 215 to write the address tag provided by the processor 101 and the valid validity bit from the inverter 219 into the tag memory module 201 at the location addressed by the processor. No operations are performed on the data memory 107 at this time. The processor 101 receives the miss signal from the hit detection circuit 116 and determines that a main memory read must be performed. The processor maintains the signals to the cache memory and performs a main memory read. When the read is complete and valid data is stabilized on the data bus 112, the main memory sends a main memory complete signal (MMC) on the conductor 118 to the cache memory 102. The NAND gate 402 is enabled by the normal, read, and miss signals and is activated by the main memory complete signal to generate a low signal on its output. The low signal on the output of the NAND gate 402 activates the NAND gate 427 which enables the bus transceivers 501 through 504 via the NOR gates 423 through 426. The direction of data flow is from the F-data terminals to the E-data terminals due to the high signal from the NAND gate 428. The NAND gate 406 is enabled by the high signals from the NAND gate 405 and by the MEA signal from the replacement circuit 113 such that the main memory complete signal forces the output signal of the NAND gate 406 low to write the data present on the data bus 112 into the data memory module A at the location addressed by the processor 101. Thus, the address tag is stored in the tag memory module 201 with a valid validity bit and the corresponding memory location in the data memory module 410 contains the up-to-date data word which was read from the main memory.

The next sample memory operation to be described is a special read operation in which a cache hit is encountered. The read/write signal is high and the special signal is low, and the address tag signals and the address signals are provided as before. The NAND gate 213 is partially enabled by the read/write and special signals from the processor. The tag memory modules are read and again the information is passed to the hit detection circuit 116 and the replacement circuit 113. In the case of a hit, however, one of the hit signals A, B, C, or D is high while the hit/miss signal from the NOR gate 311 is low. The hit signal A has been assumed to be high for ease of description. The hit signal A activates the NAND gate 213 which generates an invalid validity bit and also causes a write of the tag memory module 201. At the same time the bus transceiver 501 is enabled via the NOR gate 423 and data flow is directed from the E-data terminals to the F-data terminals by the low signal from the NAND gate 428. The data memory module 410 is read and the data word so read is passed to the processor via the data bus 112. Thus, the data memory word required is read from the cache memory and that data word is marked as invalid in the tag memory module 201 effectively removing it from the cache memory so that the location can be immediately used for new information to be written into the cache memory. The other memory operations set out in FIG. 6 are similarly performed by the cache memory.

It is understood that the above-described embodiment is merely illustrative of the principles of our invention; other arrangements may be devised by those skilled in the art without departing from the spirit and scope of the invention.

We claim:

1. In a data processing system including a cache memory and a processor for generating data word address signals and a read signal, the cache memory comprising:
   storing means for storing data words required by said processor;
   first means for identifying which data words are stored in said storing means;
   second means for identifying whether storage locations in said storing means contain valid or invalid data words;
   control means responsive to said read signal for controlling said first and second identifying means; and
   hit detection means connected to said first and second identifying means for generating a hit signal if a data word required by said processor is valid and stored in said storing means;
   characterized in that
   said control means is responsive to said read signal and said hit signal to control said second identifying means such that the storage location which contained said required data word is identified as containing an invalid data word.

2. In a data processing system including a cache memory and a processor for generating data word address signals and a read signal, the cache memory comprising:
   first storing means for storing data words required by said processor;
   second storing means for storing address tags which identify the data words stored in said first storing means;
   third storing means for storing validity bits to indicate whether storage locations in said first storing means contain valid or invalid data words;
   control means responsive to said read signal for reading from and writing into said second storage means and said third storing means; and
   hit detection means connected to said control means for comparing address tags read from said second storing means to an address tag provided by said processor to determine whether a data word required by said processor is stored in said first storing means and for responding to validity bits read from said third storing means to generate a hit signal if said required data word is stored in said first storing means and the stored data word is valid;

characterized in that said control means is responsive to said read signal and said hit signal to generate an invalid validity bit and to write said invalid validity bit into said third storing means.

3. In a data processing system including a processor for generating data word address signals and a read signal, and a cache memory; the cache memory comprising:

first storing means for storing data words required by said processor;

second storing means for storing address tags which identify the data words stored in said first storing means, said second storing means including a single bit of storage per address tag storage location for storing a validity bit to indicate whether a stored data word is valid or invalid;

first control means responsive to said read signal for controlling read and write operations of said first storing means;

second control means responsive to said read signal for controlling read and write operations of said second storing means;

hit detection means connected to said first control means and to said second control means for comparing address tags read from said second storing means to an address tag provided by said processor to determine whether a data word required by said processor is stored in said first storing means and for responding to validity bits read from said second storing means to generate a hit signal if said required data word is stored in said first storing means and the stored data word is valid, to generate a miss signal if said required data word is not stored in said first storing means, and to generate a miss signal if said required data word is invalid;

characterized in that said second control means is responsive to said read signal and said hit signal to generate an invalid validity bit and to write said invalid validity bit into said second storing means.

4. In a data processing system in accordance with claim 3 wherein said processor further generates a normal write signal and a special write signal, said cache memory being further characterized in that:

said first control means is responsive to said special write signal to write into said first storing means; and said second control means is further responsive to said normal write signal and said hit signal to generate an invalid validity bit and to write said invalid validity bit generated in response to said normal write signal and said hit signal into said second storing means, and responsive to said special write signal to generate a valid validity bit and to write said valid validity bit into said second storing means.

5. In a data processing system in accordance with claim 3 wherein said processor further generates a normal write signal and a special write signal, said cache memory being further characterized in that:

said first control means is responsive to said special write signal to write into said first storing means, and to said normal write signal and said hit signal to write into said first storing means; and said second control means is further responsive to said normal write signal and said hit signal to generate a valid validity bit and to write said valid validity bit into said second storing means, and to said special write signal to generate a valid validity bit and to write said valid validity generated in response to said special write signal into said second storing means.

6. In a data processing system including a processor and a memory system which comprises a main memory and a cache memory wherein said cache memory comprises: a data memory for storing data words; a tag memory for storing address tags to identify the data words which are stored in said data memory, said tag memory further comprising a single bit of storage per storage location for storing a validity bit to indicate whether the identified data words are valid or invalid; a method for reading said memory system comprising the following steps:

1. interrogating said cache memory to determine if a required data word is stored therein;
2. reading the data word from said main memory in the event the required data word is not stored in said cache memory or if stored is invalid;
3. gating the data word read from said main memory to said processor;
4. reading the required data word from the cache memory in the event the required data word is stored in said cache memory ad is valid;
5. gating the data word read from said cache memory to said processor;

characterized in that the following additional step is performed in the event the required data word is stored in said cache memory and is valid:

6. invalidating the data word read from said cache memory by storing an invalid validity bit in said tag memory at the address tag storage location which identified the data word read from said cache memory.

7. In a data processing system including a processor and a memory system which comprises a main memory and a cache memory wherein said cache memory comprises: a data memory for storing data words; a tag memory for storing address tags to identify the data words which are stored in said data memory, said tag memory further comprising a single bit of storage per storage location for storing a validity bit to indicate whether the identified data words are valid or invalid; a method for reading said memory system comprising the following steps:

1. reading a defined number of address tags from said tag memory;
2. checking said addresa tags against an address tag which identifies a required data word to determine if said required data word is stored in said data memory;
3. checking the validity bits associated with said address tags to determine whether said required word is valid or invalid if stored in said data memory;
4. indicating a hit if the address tag of the required data word matched an address tag stored in said tag memory which included a valid validity bit;

5. reading the required data word from said main memory in the event a miss is detected; and
6. gating the data word read from said main memory to said processor;
7. reading the required data word from said data memory in the event a hit is detected;
8. gating the data word read from the data memory to said processor;

characterized in that the following additional steps are performed in the event a hit is detected:

9. generating an invalid validity bit to be written into said tag memory at the storage location which contained the address tag which led to the cache hit;
10. writing the invalid validity bit into said tag memory at said tag memory location which generated the cache bit.

* * * * *